March 26, 1940.  A. SOBLE  2,194,874
SAFETY DEVICE FOR AUTOMOBILE PASSENGERS
Filed March 28, 1938
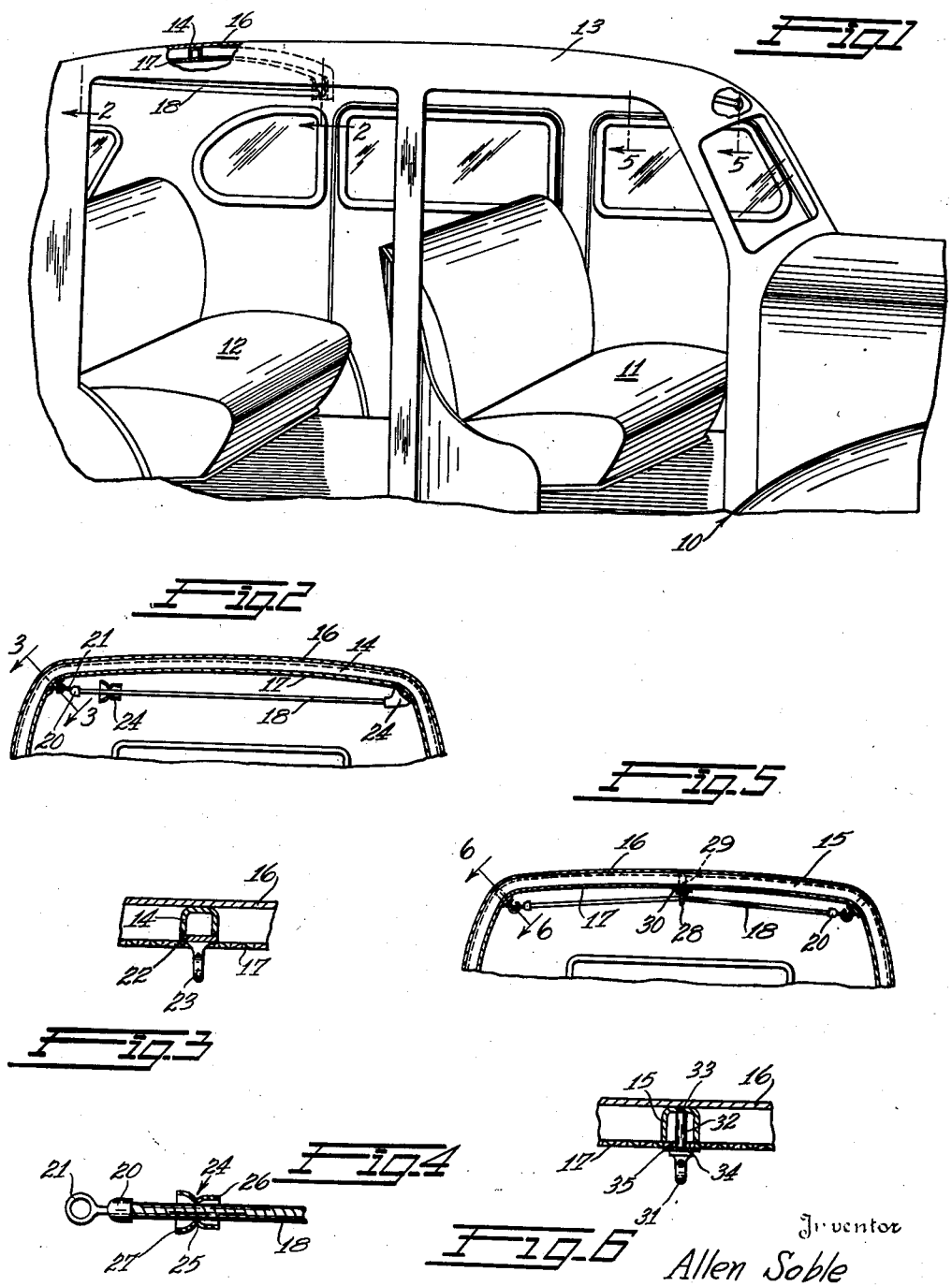
Inventor
Allen Soble
By Ralph L. Stevens
Attorney Patented Mar. 26, 1940

2,194,874

UNITED STATES PATENT OFFICE 2,194,874

SAFETY DEVICE FOR AUTOMOBILE PASSENGERS

Allen Soble, Franklin, Va.

Application March 28, 1938, Serial No. 198,570

2 Claims. (Cl. 280—150)

The present invention relates to safety devices for the protection of automobile passengers. More specifically, my invention contemplates the prevention or minimization of injuries sustained by automobile passengers as a result of sudden stops or collisions.

The word "automobile" signifies any type of passenger carrying vehicle wherein the occupants are seated and may have warning of impending disaster. However, this invention is concerned primarily with conventional road vehicles wherein the seated passengers face forwardly so that they have a slight advance notice of approaching danger.

In operation of such vehicles, the great majority of injuries caused by accidents are sustained when the occupants are tumbled about or thrown violently in a forward direction due to sudden vehicle deceleration. It may be that the feet are braced, but even then the head and trunk of the body will move into impact with parts of the vehicle. Horrible facial and scalp lacerations, as well as skull fractures, frequently result from impingement and impalement on the so-called "shatterproof" glass, which has strong resistance to breakage and a clinging action after it has given way in the locus of impact. The front seat passenger is most seriously endangered on this score. The driver is partially protected by confinement behind the steering wheel. The rear seat passengers have nothing adequate to which they may cling or against which they may brace themselves quickly, and they occupy a space in which they may be thrown about laterally as well as forwardly.

Heretofore it has been proposed that "safety belts," in the nature of straps be provided to encircle the waists or chests of the passengers. The difficulty with such devices is that people are loath to go to the inconvenience of constantly hooking and unfastening the belts on the occasions of frequent and numerous rides. Moreover, such devices, when used, are not entirely satisfactory because in serious accidents they produce rib or abdominal injuries, without preventing the head and the upper part of the trunk from being propelled forwardly with violence into impact with adjacent vehicle superstructure.

It is the primary object of the present invention to devise means which, without interference with normal and convenient use of the vehicle seats by the passengers, affords obtainable protection or insurance against injuries of the kind above mentioned. More specifically, it is an important object of my invention to provide an appointment or attachment feature on the vehicle body which may be utilized by the occupants as a means to prevent them from being catapulted in the event of rapid deceleration. The device is out of the way and requires no manipulation, but can easily be grasped with both hands by a passenger. It is useful also to semi-invalids and aged people in getting to and from a seated position.

It is a major object of my invention to provide a vehicle body accessory adjacent the top and of such design that it may be grasped readily in the palms of the hands to steady the passenger against lateral and twisting movement and to prevent the head and trunk of the body from being projected forwardly.

A further object is to so design my safety device that it will not be objectionable in appearance and will not have exposed parts likely to cause injuries to any part of the anatomy coming into engagement therewith.

These and other objects of the present invention will clearly appear upon a study of the following detailed description when taken in conjunction with the accompanying drawing and the appended claims. In the drawing:

Figure 1 is a perspective view of a portion of an automobile body that has the safety devices of this invention attached thereto.

Figure 2 represents a transverse section taken vertically on the plane of line 2—2, Figure 1, and showing the preferred form of device with a part thereof out of its normal position.

Figure 3 is an enlarged fragmentary section taken on the plane of line 3—3, Figure 2, to show the anchoring means for the rope element.

Fig. 4 is a detail view of one end of the rope element.

Figure 5 represents a transverse section taken vertically on the plane of line 4—4, Figure 1.

Figure 6 is an enlarged fragmentary section taken on the plane of line 6—6, Figure 5, with the rope element detached.

With continued reference to the drawing, wherein like numerals are employed to designate like parts, a conventional automobile body 10 is shown having a front seat 11, a rear seat 12, and a top 13. The skeleton framework of the body will depend upon the age and source of manufacture of the vehicle, and may consist of wood or metal or a combination of the two. In the illustrated example, the top framework consists primarily of several transverse steel ribs such as ribs 14 and 15, substantially U-shaped in cross-section. Usually a pair of such ribs will be found just above the front edges of the two seats, in which event the safety devices of the present invention preferably will be anchored to the ribs. If there are no ribs at or adjacent to these positions, the safety devices may be anchored to longitudinal side ribs or other body structure adjacent the upper edges of the body side walls. As will be seen shortly, correct location of the safety ropes is very important.

Modern tops like that illustrated, comprising an external sheet steel sheathing or cover 16 and an internal finishing cloth 17, are so low as to afford hardly more than "head-room" for the passengers, and have a slight convex curvature when viewed in transverse section; and therefore they are particularly suited to effective adaptation of my invention. The low elevation permits a taut safety rope or strap to be disposed where it can be grasped conveniently—and yet disposed close to the roof so as not to form an interfering obstacle or hat remover; and the slight curvature naturally forms a small clearance space between the finishing cloth and the rope so that as the passenger clutches or grabs for the rope his fingers automatically slide along the smooth cloth and receive the rope.

In its preferred form, the rope comprises a round cord 18, approximately ½ inch to ⅝ inch in diameter, formed of rubber and fabric and having at its ends a pair of securely fastened ferrules 20 carrying integral metal eyes 21. The cord may consist of a rubber core covered with fabric, or may have the materials interwoven and braided as in known rope-rail design. It is desirable that the fabric conceal the rubber and harmonize with the cloth 17, and it is essential that the cord shall not be too yielding or elastic. Preferably it is of such length as to be placed under slight tension when assembled, and sufficiently elastic to yield only a few inches when grasped by the hands of one or more passengers upon sudden stopping of the vehicle.

A suitable permanent form of anchoring means—best seen in Figure 3—comprises a metal plate 22 welded across the channel of the rib 14 and having an integral hook 23 designed to receive one of the eyes 21 of the rope element. This detachable connection permits the device to be made optional equipment on new automobiles. If desired, the hook may be seperate from the plate and have a screw thread connection therewith. The pair of anchoring devices preferably are located, as shown, substantially at points where the roof may be said to join or merge with the side walls of the body.

For the purposes of concealing the anchoring parts and of covering the metal parts to protect the occupants against possible injuries, a pair of soft rubber members are provided in the form of hollow sheaths 24. Prior to attachment of the rope element, these sheaths may surround the cord 18 as in Figure 4, but subsequently are forced axially into the position illustrated at the right hand end of the rope in Figure 2. Each has a restricted throat portion 25 designed to fit snugly between an eye 21 and a ferrule 20, a sleeve portion 26 designed to surround a ferrule 20, and a cup portion 27 designed to press against the finishing cloth 17 and to house the intercoupled hook and eye.

If desired, the cord 18 may be connected to the top between its ends at one or two spaced points for reinforcement and to afford separate handholds for several seat occupants. Figure 5 illustrates a suitable three-point connection, as well as a modified type of anchorage device. Here the central part of the cord may pass through a hook or an eye 28, which has an elongated shank 29 threaded at its terminal for reception in a tapped hole in the rib 15. A fibrous washer 30 may be disposed around the shank between the eye and the cloth 17.

The ends of the rope element in Figure 5 may be anchored as in Figure 2, or by detachable hook devices, best seen in Figure 6. Each device comprises a hook 31 having an enlarged shank 32 provided with a threaded terminal 33 for reception in a tapped hole in the bottom of the steel channel member (or having simply a shank in the form of a wood screw where the top framework is of wood), and an integral shoulder 34 adjacent the hook. A fibrous washer 35 is engaged by this shoulder and pressed against the edges of the rib 15 to conceal the hole necessarily made through the cloth 17. Protective rubber sheaths 24 may be used here also, as in Figure 4.

The manner of use of the cords 18 should now be obvious. Each may be grasped with one hand to facilitate getting into and out of the seats, or by both hands to prevent the head and trunk from being thrown forwardly upon collision. The body is kept in balance through use of both hands, slightly spaced apart, on the rope. If the feet are simultaneously braced, breaking of bones in the legs is highly improbable, due to transfer of a large part of the forces of reaction to the top through the arms. It is emphasized that the rope should be just slightly above and forwardly of the heads of the seat occupants, and preferably slightly below the finishing cloth, so that a natural upward swing of the arms (with palms of the hands facing forwardly) will accurately and readily bring the cord into the palms.

Obviously, numerous changes may be made in the details of rope design and anchorage without departing from the spirit of the invention; and therefore I wish to be limited, as is customary, only by such restrictions as necessarily must be construed as present in the appended claims to distinguish over the prior art.

What is claimed is:

1. A device of the character described, comprising a flexible and relatively soft elongated member, metallic fastening elements projecting axially from the ends of said member, and relatively soft cover elements surrounding said member and designed to slide axially thereof and frictionally engage and conceal said metallic elements.

2. In combination with an automobile body having a passenger seat, a flexible and relatively soft rope element designed to be mounted substantially in a straight line transversely of and within said body adjacent said seat, ferrules at the ends of said rope element, and metallic members joining said ferrules to said body, and a soft rubber sheath at each end of said rope element, said sheaths including sleeve portions closely surrounding said ferrules and cup portions snugly housing the adjacent metallic members.

ALLEN SOBLE.